Patented June 17, 1952

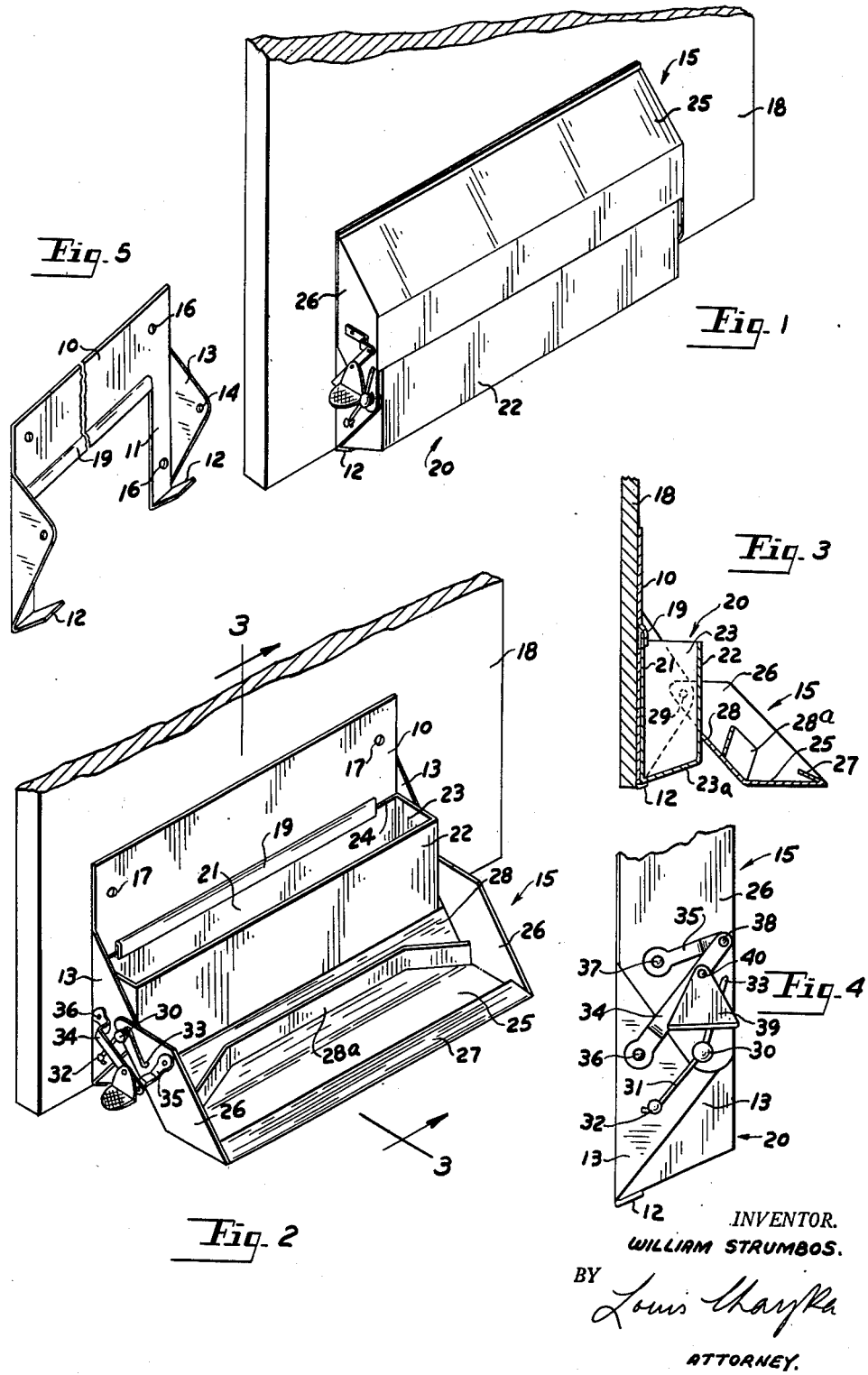

2,601,069

UNITED STATES PATENT OFFICE 2,601,069

DUSTPAN

William Strumbos, Detroit, Mich.

Application March 1, 1951, Serial No. 213,361

4 Claims. (Cl. 65—20)

My invention pertains to a combination of a dust pan and a door, the dust pan being mounted thereon and being ordinarily out of sight. Specifically, the dust pan is to be mounted on a kitchen door or on the door of a closet and is adapted to be swung down against the floor for operative use. The nature of the invention and the manner of its use will be understood fully in view of my description of the pan in its combination with a door in the light of the enclosed drawing in which:

Fig. 1 is a perspective view of the lower part of a swinging door with the dust pan mounted thereon;

Fig. 2 is a perspective view of the same dust pan as mounted on a door, the pan being shown in its open position;

Fig. 3 is a sectional view on line 3—3 of Fig. 2;

Fig. 4 is an enlarged side elevational view of the lower part of the dust pan, the view disclosing elements to keep the pan in a normally closed position;

Fig. 5 is a perspective view of a component element of my dust pan.

Similar numerals refer to similar parts throughout the several views.

The dust pan of my invention comprises really a number of elements, included among which is a dust container, a bracket to support the same, and a hinged dust pan proper. The bracket, best shown in Fig. 5, includes a flat plate 10 having at each end a vertical downwardly-extending leg 11, each leg terminating with an upwardly-turned lug 12. Two triangular flanges 13, each extending from the leg at right angle to the plate 10 forwardly therefrom, are each provided with a hole 14, the holes serving as bearings for a pivotal support of the pan proper, generally indicated by numeral 15. Both plate 10 and legs 11 are provided with holes 16 for application of screws 17 whereby the plate may be affixed to one side of a door 18. Forming a part of the lower edge of plate 10 is a lip 19 extending between said legs 11.

Supported by lugs 12 and resting thereon is a removable container, generally indicated by numeral 20. The container includes a rear wall 21, a front wall 22, two side walls 23, and a bottom 23a. The top edge 24 of the rear wall 21 of said container fits normally under the lip 19 of plate 10. The end walls 23 are in abutment with flanges 13, the container being disposed therebetween, as best shown in Fig. 2. Being open at the top, the container is normally covered by the pan proper 15. This, as disclosed in Figs. 2 and 3, is made in the form of a scoop including a front part 25 adapted to lie horizontally upon a floor and two side walls 26, each of the side walls having the form of a rhomboid. The front end of the scoop is turned back upon itself, this resulting in the formation of a slight incline 27. The rear portion 28 of the scoop is set at an angle to portion 25 and supports a baffle 28a, which, as shown in Fig. 3, lies substantially vertically from the interior of the scoop when the latter is in its open position, as shown in Fig. 3.

One side wall 26 of the pan proper is provided at its corner remote from the incline 27 with an inwardly extending stub pin 29, which is shown in dotted lines in Fig. 3. A corresponding pin within the other side wall 26 is marked 30. A spring 31, one end of which affixed to flange 13 at 32, is coiled about one end of pin 30 and is affixed at its opposite end to side wall 26 of pan 15 at 33, as shown in Figs. 2 and 4. As a means for swinging the scoop 15 down to its open position against the tension of spring 31, I am using two links 34 and 35, respectively, the first being mounted on flange 13 at 36, the other being mounted at 37 on a side wall 26 of the scoop, and both being pivotally joined to each other at 38, as shown in Fig. 4. A pedal 39, pivotally mounted on link 34 at 40, serves as a means for bringing the pan 15, by means of foot pressure on pedal 40, from its closed position, as shown in Fig. 1, to its open position, as shown in Figs. 2 and 3.

The manner in which the dust pan may be used is quite obvious. Ordinarily the scoop 15 is in its inverted position so that it covers container 20 from the top. When pedal 39 is pressed down, the scoop is swung downwardly by means of links 34 and 35 to a horizontal position so that its outer portion 25 will lie on the floor under the door. While said scoop is in said position dust may be swept into the scoop to occupy the space between the incline 27 and the baffle 28a within said scoop. On release of the pedal the scoop will swing back to its inverted position. Any dust swept into the scoop will be discharged therefrom into container 23. From time to time the container, which rests on lugs 12 and is retained in place by means of lip 19, may be removed and emptied.

It will be understood that some changes may be made in the structure of my device without deviating from the inventive principle disclosed herein.

What I, therefore, wish to claim is as follows:

1. In combination with a hinged house door, a dust pan of the kind described, said dust pan including a bracket on one side of the door along its lower portion, a dust container open at the top and suspended by the bracket, a scoop hinged to the bracket, spring means to hold the scoop in a position to cover the container from the top, and pedal means to swing the scoop against the tension of the spring means downwardly to cause it to lie on the floor below said door.

2. In combination with a door, a bracket on one side of said door at the lower portion thereof, the bracket having a flange at each end at right angles to the plane of the door, a dust container disposed between the flanges and open at the top, a scoop pivotally connected to said flanges, the scoop normally covering the container from the top, spring means to keep the scoop in said container-covering position, and pedal means connected by intermediate means to said scoop to bring it down against the tension of the spring to a substantially horizontal position to lie on a floor.

3. In combination with a door, a bracket mounted thereon, the bracket including an outwardly-extending flange at each end thereof, a removable dust container between the flanges, the container being open at the top, a scoop pivotally connected to said flanges and including a flat member adapted to be lowered to a horizontal position, spring means to keep the flat member of the scoop covering the open top of the container, and pedal means connected by intermediate means to said scoop to cause it to lie on a floor.

4. In combination with a door, a bracket on the lower portion of one side thereof, the bracket including an oblong plate having a flange at each end, the flanges extending at right angles thereto, said plate having also outwardly-extending lugs along its lower edge and a horizontal outwardly-extending lip substantially midway its height, a dust container resting on said lugs, the dust container being open at the top and having a rear wall engaged by said lip, a scoop pivotally connected to said flanges, the scoop normally covering the container from the top, spring means to keep the scoop in said container-covering position, and pedal means connected by intermediate means to said scoop to bring it down against the tension of the spring to a substantially horizontal position to lie on a floor.

WILLIAM STRUMBOS.

REFERENCES CITED

The following references are of record in the file of this patent:

UNITED STATES PATENTS

| Number | Name | Date |
| --- | --- | --- |
| 570,026 | Koehler | Oct. 27, 1896 |
| 622,284 | Snyder | Apr. 4, 1899 |
| 769,436 | Gentry | Sept. 6, 1904 |
| 2,042,605 | Knapp | June 2, 1936 |
| 2,116,017 | Franke | May 3, 1938 |